(12) United States Patent
Durham

(10) Patent No.: US 7,797,845 B2
(45) Date of Patent: Sep. 21, 2010

(54) LEVELLING DEVICE

(76) Inventor: John Anthony Douglas Bruce Durham, 13 Victoria Square, London SW1W 0RA (GB)

( * ) Notice: Subject to any disclaimer, the term of this patent is extended or adjusted under 35 U.S.C. 154(b) by 0 days.

(21) Appl. No.: 12/162,100

(22) PCT Filed: Jan. 18, 2007

(86) PCT No.: PCT/GB2007/000162
§ 371 (c)(1),
(2), (4) Date: Feb. 5, 2009

(87) PCT Pub. No.: WO2007/085800
PCT Pub. Date: Aug. 2, 2007

(65) Prior Publication Data
US 2009/0219522 A1 Sep. 3, 2009

(30) Foreign Application Priority Data
Jan. 24, 2006 (GB) .................. 0601425.2

(51) Int. Cl.
*G01C 15/06* (2006.01)
*B23H 7/04* (2006.01)
(52) U.S. Cl. .................. 33/290; 33/DIG. 21
(58) Field of Classification Search ........... 33/290–291, 33/DIG. 21, 773, 124, 679
See application file for complete search history.

(56) References Cited

U.S. PATENT DOCUMENTS

| | | | |
|---|---|---|---|
| 3,771,876 A | 11/1973 | Ljungdahl et al. | |
| 5,287,627 A | 2/1994 | Rando | |
| 5,367,782 A * | 11/1994 | Izumitani | 33/367 |
| 5,459,932 A | 10/1995 | Rando et al. | |
| 5,539,990 A | 7/1996 | Le | |
| 5,829,147 A * | 11/1998 | Kousek et al. | 33/293 |
| 6,014,211 A | 1/2000 | Middleton et al. | |
| 6,820,343 B2 * | 11/2004 | Waibel et al. | 33/293 |
| 6,832,864 B2 * | 12/2004 | Patton et al. | 33/18.1 |
| 7,107,980 B1 * | 9/2006 | Craig | 33/290 |
| 7,444,760 B2 * | 11/2008 | Hoffmann et al. | 33/773 |
| 2006/0150431 A1 * | 7/2006 | Williams et al. | 33/773 |
| 2007/0107241 A1 * | 5/2007 | Sergyeyenko | 33/290 |
| 2007/0124952 A1 * | 6/2007 | Williams et al. | 33/773 |
| 2009/0019712 A1 * | 1/2009 | Sinclair | 33/32.3 |
| 2009/0293293 A1 * | 12/2009 | Lawrence et al. | 33/343 |

FOREIGN PATENT DOCUMENTS

| | | |
|---|---|---|
| EP | 0 950 873 | 10/1999 |
| EP | 1 564 526 | 8/2005 |
| GB | 2 389 193 | 12/2003 |

OTHER PUBLICATIONS

Office Action for Chinese Application No. 200780002961.4, date of issue Dec. 11, 2009.

\* cited by examiner

*Primary Examiner*—Yaritza Guadalupe-McCall
(74) *Attorney, Agent, or Firm*—Nixon Peabody LLP; David B. Ritchie

(57) ABSTRACT

A mobile leveling apparatus for quickly and simply transferring the height of a visible, fixed datum point from a distant wall or column across a room. The leveling apparatus is hand-held and can be operated by a single user. The operator physically holds the apparatus at the actual point where the height of the datum point is required, thereby ensuring that the apparatus is always under his/her control.

15 Claims, 4 Drawing Sheets

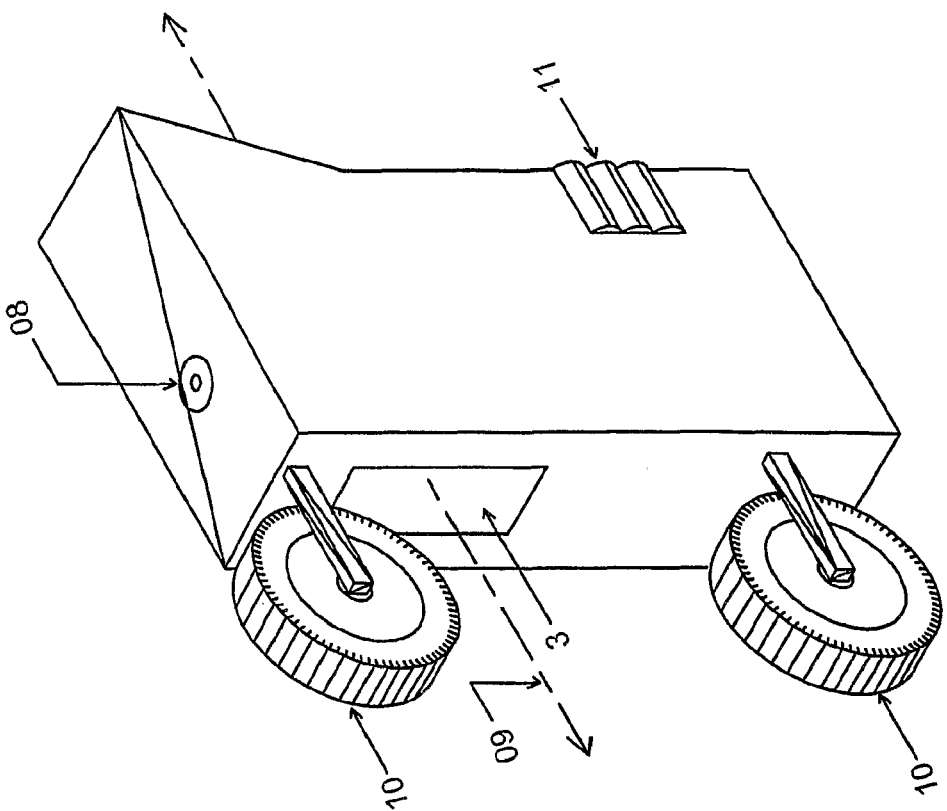
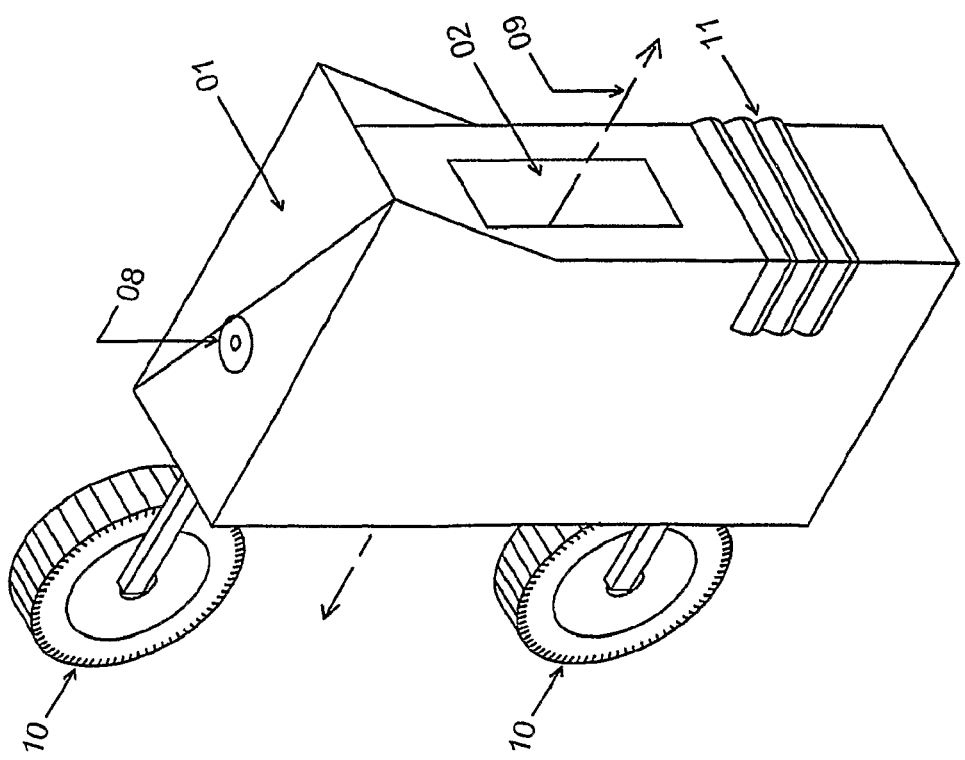

LEVELLING DEVICE

PRIORITY CLAIM

This application claims priority based on International Patent Application No. PCT/GB2007/000162, filed Jan. 18, 2007, entitled "Leveling Device", which claims priority of United Kingdom Application No. 0601425.2, filed on Jan. 24, 2006.

BACKGROUND

In the construction industry it is often necessary to create multiple accurate datum level/points in all areas for all buildings being constructed or renovated. Creating these datum points at various locations on columns or walls enables a builder to ensure his/her infrastructure work is sufficiently level, and to relate it to the building datum heights established by the Architect. It also enables other traders to correctly install their works so that gaps between, for example, false ceilings, floors, windows, plumbing, electrics and inbuilt furniture are accurate. It is also often necessary to determine an individual datum level accurately between two points, for example across a room or window or door opening, or a datum point between a series of columns cast in a particular area.

Laser technology has been adapted to carry out the type of leveling work described above and is now widely used for this purpose. Lasers substantially reduce the time and effort required to create datum points when compared to the traditional methods.

However, a laser level in itself has no means of defining whether its light path, or line of collimation, is actually horizontal. The traditional leveling technology has therefore to be combined with laser light technology. For example, a laser generating light can be attached to a spirit level to enable the user to point the laser light, for example, across a gap. However to make the spirit level horizontal requires the operator to move one end of the level up or down until the bubble in the radiused glass vial is centered. If a level datum is required on each side of a gap and the gap is too wide for the operator of the level to reach by hand, the operator will summon an assistant to mark the distant point across the room, even though the operator holding the level can see the point where he/she requires the datum mark to be made.

An alternative system, which achieves greater accuracy, is also available for performing the leveling work. Here, a laser light mechanism is retained in a box and suspended in a pendulum which can rotate freely when the laser box is + or −5° to the vertical. The continuous swinging action of the pendulum is damped by passing the base of the pendulum through a magnetic field. The pendulum comes to rest very quickly and the subsequent laser ray defines a precise horizontal light path on the collimation line of the instrument, centered near or at the pivot point of the pendulum, and at a normal to the gravitational vertical line of the pendulum. Modern laser levels can define a dot of light or a short horizontal line or a continuous line subscribing 360°. To create a series of level points around a room the operator sets the laser box onto a dedicated tripod placed in the middle of the room, switches the laser on, ensuring the level is sufficiently upright to allow the pendulum to swing, and then walks around the room marking level datum points at locations where they are required. Whilst this operation only requires one operator, the valuable laser level on the tripod is left unattended and could possibly be inadvertently knocked over by other building tradesman.

At other times it is necessary to relate the collimation line of sight of the laser level with a known main datum level point, marked on a vertical surface and defined on a building drawing, and then to transfer the height of this known main datum point around an area to enable building tradesman to directly relate their works to the known main datum point. The difficulty with the traditional technique of using a laser level mounted on a tripod to transfer the height of this known main datum is that it is virtually impossible to set the height of the tripod and thus the height of the laser level such that the line of collimation of the laser level coincides exactly with a main datum. This means that the difference in height between the line of collimation of the level viewed at the location of the main datum and the main datum itself has to be measured and then added or subtracted from the main datum height in order to calculate the precise height of the line of collimation of the level. Invariably this will necessitate the time consuming use of a calculator or pen and paper and, once again, whilst this operation only requires one operator, the valuable laser level on the tripod is left unattended and could possibly be inadvertently knocked over by other building tradesman.

SUMMARY OF THE INVENTION

The object of the present invention is to provide a simple cost effective means of transferring a single datum across a relatively wide gap (greater than 5 meters for example), or a series of multiple levels around or across a room, with only one operator and without the need for bulky and cumbersome tripods.

The invention comprises hand-held, mobile leveling apparatus which the operator physically holds at the actual point where the height of the datum point is required to be marked. The operator is then able to quickly and simply transfer the datum height from a visible fixed point on a distant wall or column across a room. There is no requirement for the datum point to be on the same surface as that which the operator holds the apparatus against. The fixed point could also be a main datum point which is transferred around the room without the need for tedious calculations. Alternatively, the operator could set up a tripod in the middle of a room with a cardboard or plastic target fixed to the tripod and walk around the room with the invention marking the points where he/she requires a level point to be established. During these operations, the operator retains the laser box in his/her possession at all times and so there is no possibility of damaging the instrument.

An alternative use of the apparatus of the present invention is for providing information about the level of a suspended or temporary floor at various locations. In this application, an adjustable stand is attached to the base of the level apparatus, and is then set to the desired height manually by the operator, such that the height of the laser and the stand is the same height as the distance between the distant datum point or main datum point and the final correct floor level. The level of the floor at a second location can then be compared to the level at the original location simply by moving the apparatus to the second location and comparing the height of the laser with that of the datum point or main datum point to which it was set. Manual adjustments to the floor level can then be made as necessary.

The conventional leveling apparatus comprising a laser box mounted on a tripod in the centre of a room is thus made redundant. The mobile hand-held laser box is independently operated by the tradesman, is always held at the position where the height information is required, and therefore provides an extremely versatile mobile leveling tool.

The invention will be better understood from the following detailed description and the accompanying drawings of an exemplary leveling instrument.

DESCRIPTION OF THE DRAWINGS

FIG. 1 is a perspective view of the leveling instrument from the front (a) and from the rear (b).

DETAILED DESCRIPTION

Figure 2:
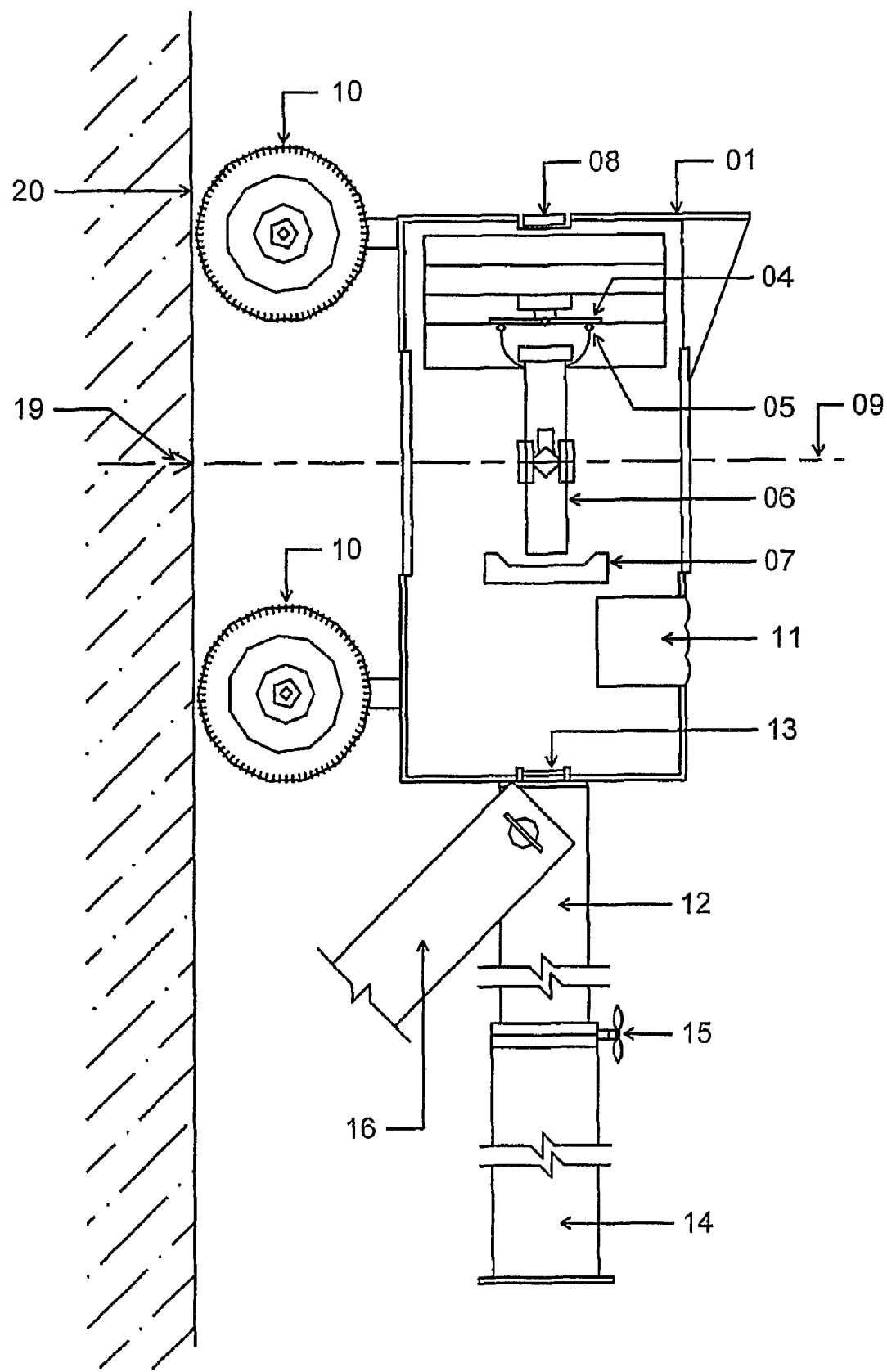
FIG. 2 is a sectional side elevation of the instrument in FIG. 1 with the measuring stick connected.

The invention comprises a laser which is configured to work in a similar manner to the conventional laser in a box leveling mechanism, as described previously, consisting of a laser beam attached to a swinging pendulum inside the box. The laser casts a horizontal dot, line or fan which is always horizontal provided the pendulum is in within + or −5° of vertical. In contrast to conventional leveling apparatus, the apparatus according to the present invention is held in, and operated by, one hand of the operator.

In the drawings the numeral 1 represents the complete mobile level box containing the laser assembly and pendulum. Plain glass windows 2 and 3 allow the rays of the laser to be projected from the front and the rear of the mobile level box respectively. The laser assembly mounted at any position along the pendulum is suspended from gimbals at a pivot point 4. Springs 5 attach the pendulum 6 enabling it to swing with minimal friction. The movement of the pendulum is dampened by the magnet 7. The laser battery power is switched on by pressing button 8 mounted on top of the instrument.

The box can have means for locating it onto the surface where the datum height is required, and for allowing it to be moved freely up or down the surface. This locating means can be at least one of a wheel, a roller, a ball bearing or a low friction pad. Preferably, the means comprises two wheels, which can comprise rubber, and which are free to rotate. Alternatively, the means can comprise three or more wheels, which can comprise rubber, and which are free to rotate. The means for locating and moving the device can be mounted on and extend from the rear of the laser box.

Figure 3:
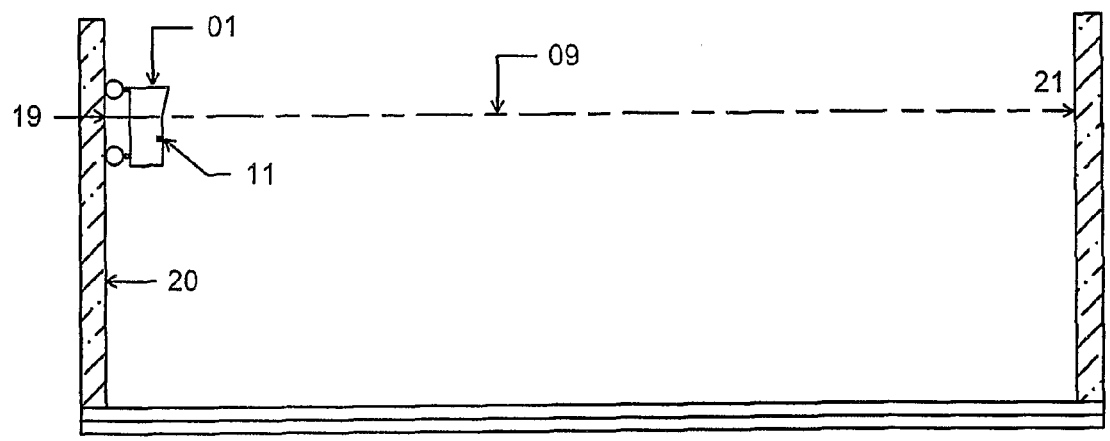
FIG. 3 is a view of the mobile level being used to transfer a datum or main datum across an open space from a fixed datum or main datum on a distant wall or column.

With power activated the laser light passes through windows 2 and 3. In the example shown in the figures, the laser projects a horizontal laser light 9 from the front and the rear of the mobile laser box. Freely rotating rubber wheels 10 are pressed against the wall 20, to enable the instrument to be moved up or down the wall to align the laser with the visible datum point or main datum point across the room. This can be done manually by the operator who holds the instrument in one hand around the grip lines 11. By the very fact that the wall will invariably be within the vertical by + or −5° the pendulum will be activated, and the laser light will be kept horizontal. This enables the operator to transfer the height of a datum point which could also be a main datum point 21 to a position behind the instrument, and to mark this position—using his/her free hand for example—at point 19, as in FIG. 3. The accuracy of the horizontal line to true level can be within 1 to 2 mm depending on the accuracy of the pendulum mounted in the level box.

According to one aspect of the invention, which is particularly relevant to an embodiment having two locating means 10 arranged such that one is directly above the other in the operating position, the whole leveling apparatus may be rotated about a substantially vertical axis passing through the points of contact between the locating means and the wall. This enables the leveling device to pick up datum points which may not be directly opposite it on a distant wall. According to this aspect of the invention, the level is able to pick up any datum point lying in a horizontal plane within an arc of, for example, 120 degrees of its location.

According to another aspect of the invention, there is provided means for rotating part of the leveling device about a substantially vertical axis once it has been located on the surface where the datum height is required. For example, the means for rotation could be positioned between the locating means 10 and the mobile level box 1, such that the locating means remain(s) on the surface while the mobile level box 1, which contains the laser, is able to rotate about an axis defined by the means for rotation, this axis being substantially vertical and substantially parallel to the surface on which the datum point is required when the leveling device is in the operating position. This enables the horizontal laser light to be pointed at datum points situated within a large range of angles of the device, rather than just at a datum point directly opposite the device. The means for rotation could, for example, comprise a hinge and/or a bearing. There may also be provided means for locking the rotation means once the leveling device is correctly oriented, which could, for example, comprise a pin.

Figure 4:
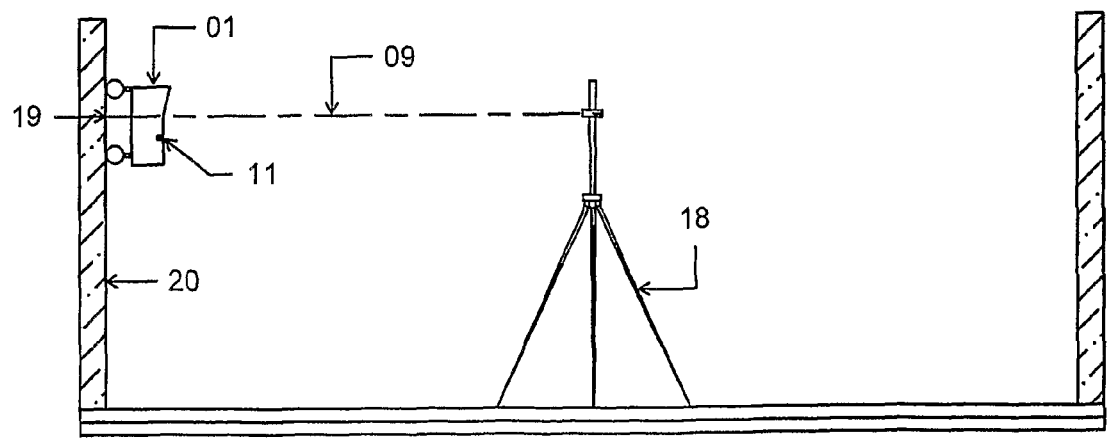
FIG. 4 is a view of a plain target mounted onto a tripod enabling the mobile level to transfer the same datum point as the target around distant walls or around corners.

A tripod and target 18 can be located in a room to enable the operator holding the level against walls or columns 20 to make a series of datum points or main datum points around rooms or blind corners by viewing the target and marking the datum point or main datum point at the back of the level on the wall or column 19, as in FIG. 4. In this instance, if the operator requires the target on the tripod to be the same level as the main datum, the operator has to position the leveling device above or below the main datum point, move the leveling device up or down such that the laser height coincides with that of the target on the tripod, mark the wall behind the leveling device and measure the difference in height between this point and the main datum. He/she is then able to adjust the target on the tripod by the dimensional difference between the original target height and the main datum height so that the target is then at the same height as the main datum. Thereafter all sights and points leveled around a room taken from the target on the tripod will be at the precise main datum height.

Using the apparatus of the present invention, and the process described above, the operator can easily transfer the height of a distinct datum point or a main datum point to a point precisely where the new datum point is required. The mobile laser box can then be carried around with the operator without fear of damage because once the laser box is removed from the wall, the pendulum will automatically lock into place.

By way of further example, the hand-held leveling apparatus of the present invention can be used to check the level of suspended floors at various locations. The tradesman may wish to check that a temporary floor used to support concrete, to be cast on the floor, has a consistent level throughout. For this purpose, the level can be mounted on a measuring stick 12 by screwing the measuring stick to the base of the level at 13, as in FIG. 2. The length of the measuring stick can be adjusted, manually or otherwise, by the operator by sliding member 12 inside member 14 until the correct length 22 has been established in relation to the datum point or main datum point. It can then be locked at 15. The level operator then merely rests the end of the measuring stick vertically at the location requiring to be leveled, and compares the height of the laser with that of the datum point or main datum point. If the laser line is above or below the datum point or main datum point 21 the tradesman can then quickly, manually, adjust the concrete shuttering until he/she has is informed by the level operator that the shuttering is at the correct height. The operator can give this instruction because the laser light coincides precisely with the datum point or main datum point 21.

Figure 5:
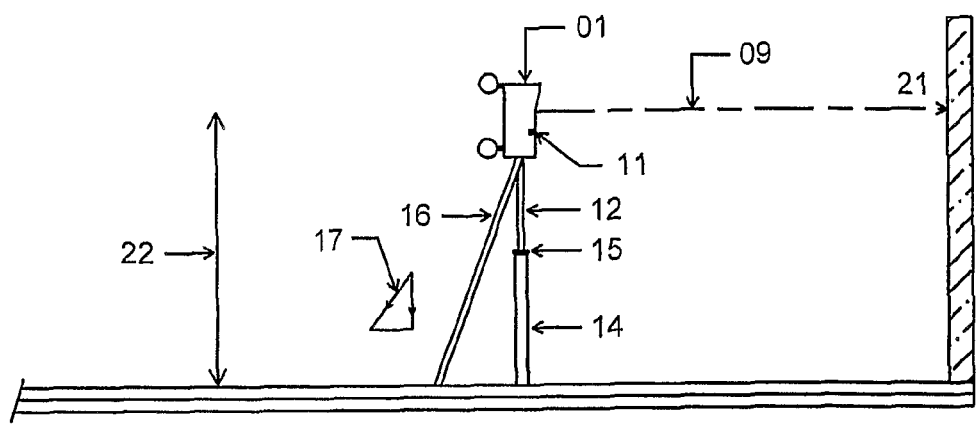
FIG. 5 is a view of the mobile level mounted on the measuring stick, which incorporates a support arm to stabilize it, for leveling local high or low points on a floor or ceiling, related to a fixed datum or main datum.

In order to stabilize the level, which will be hand-held by the operator, and to bring the level to the vertical or near vertical position required to activate the pendulum and laser, an angle stick 16 can be propped and adjusted against the floor by the level operator while he/she is holding the level. The rigid triangle 17 thus formed allows the pendulum to be released and the datum point to be viewed, as in FIG. 5.

Accordingly, there is provided a method for comparing the height of a floor at a first location with the height of the floor at a different, second, location using a hand-held leveling and adjustable stand apparatus which comprises: an outer casing; a laser contained within the outer casing; a window in the casing for allowing laser light generated by the laser to pass through; means for ensuring that the laser light is emitted in a horizontal plane when the apparatus is held in a generally vertical operating condition; and a stand which is adjustable in height, the method comprising steps of: fixing the height of the stand at the first location such that the height of the laser is the same as the height of a visible datum point on a generally vertical wall; moving the stand and leveling apparatus to the second location; measuring the difference between the height of the laser with the stand and apparatus in the second location and the height of the datum point or main datum point on the generally vertical wall.

Furthermore, this method can further comprise a step of adjusting the height of the floor such that the height of the laser at the second location is the same as the height of the datum point or main datum point on the generally vertical wall.

Once again the whole operation is greatly simplified because there is no requirement to first set up the tripod and to then assess the exact height of the laser level in comparison to the datum point to which the height of the temporary floor is related. Furthermore, the entire leveling operation could be carried out by the same tradesman who is actually adjusting the shuttering. At all times the level is in his/her possession. In all of the examples, the laser leveling apparatus is at the target position as opposed to being set up on an independent tripod at some distance from the point at which leveling is required.

Figure 6:
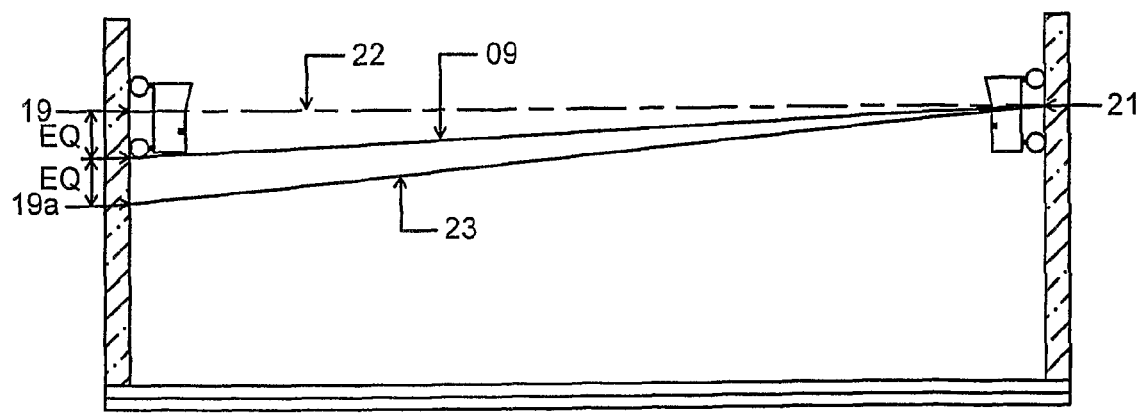
FIG. 6 is a view showing a method of checking for error in the mobile level.

In the event that the level is inadvertently dropped or damaged there is a very convenient way of establishing if the laser light attached to the pendulum is not describing a true level line. The operator sights the main datum 21 in FIG. 3 and marks the same level behind the instrument at 19. The operator then carries the level to the main datum 21 on the opposite wall and manually adjusts the height of the level against the wall or column on which the main datum 21 is positioned, see FIG. 6, ensuring that the laser line projecting out of the rear of the level precisely coincides with the main datum 21. by pointing the level such that the laser line 09 then projects across to the original marked datum point 19 on the opposite wall, if the laser point or line 09 does not precisely coincide with 19 then the instrument is out of adjustment. However the true level difference between 19 and 21 is exactly half the distance of the error at 19. An exaggerated level error established at 19 having sighted the datum is shown 22. The level 01 projects the exact same error when held over datum 21 to the new datum point 19a. The absolute correct level difference between 19a and 21 is now (19-19a)/2. This enables the operator to continue to use the instrument and create accurate levels until such time as the laser assembly can be adjusted on the pendulum to project a true level laser line.

What is claimed is:

1. A hand-held, mobile, levelling apparatus comprising:
   an outer casing;
   a laser contained within the outer casing;
   a window in the casing for allowing laser light generated by the laser to pass through;
   a locator arranged to locate the apparatus on a surface such that it is placed into a generally vertical operating position; and
   a suspension device arranged to ensure that the laser light is automatically emitted in a horizontal plane when the apparatus is held in the generally vertical operating position, wherein:
   the apparatus is arranged such that the laser light is projected from the apparatus in a direction which is away from the surface on which the apparatus is located;
   the locator is arranged such that the apparatus is freely moveable along the surface in a vertical direction, whilst always remaining in contact with the surface, such that it can be located into a position at which the laser light is the same height as the height of a remote, visible, datum point or main datum point; and
   the apparatus is further arranged such that the height of the datum point or main datum point to be transferred to the surface on which the apparatus is located.

2. The apparatus of claim 1, wherein the locator is located on the opposite side of the apparatus from the window.

3. The apparatus of claim 1, wherein the suspension device comprises at least one of a gimbal, a pivot point, a spring, a pendulum and a magnet.

4. The apparatus of claim 1, wherein the locator comprises at least one of a wheel, a roller, a ball bearing or a low friction pad.

5. The apparatus of claim 1, wherein the locator is arranged to allow the apparatus to be rotated about a substantially vertical axis passing through the points of contact between the locator and the wall whilst the apparatus is held in the generally vertical operating position, so as to change the direction of the laser light within a horizontal plane.

6. The apparatus of claim 1 further comprising a second window arranged to allow laser light through, wherein the laser light exiting through the second window is arranged such that the height of the laser is transferable to the surface on which the apparatus is located.

7. The apparatus of claim 1 further comprising a rotator arranged such that at least a part of the apparatus is rotatable about a substantially vertical axis whilst the apparatus is held in the generally vertical operating position, so as to change the direction of the laser light within a horizontal plane.

8. The apparatus of claim 7 wherein the part of the apparatus which is allowed to rotate comprises at least the laser.

9. The apparatus of claim 7 wherein the rotator comprises at least one of a hinge or a bearing.

10. The apparatus of claim 1 further comprising a stand which is adjustable in height and which is attached to a surface which forms the lower surface of the apparatus when the apparatus is in the operating position, wherein the stand is arranged to hold the apparatus in the substantially vertical operating position and comprises a fixer arranged to fix the height of the stand.

11. The apparatus of claim 10 further comprising an arm attached to the stand for stabilizing the apparatus.

12. A method for transferring the height of a datum point or main datum point to a remote surface, from which the datum point or main datum point is directly visible, using a hand-held levelling apparatus which comprises:

an outer casing;

a laser contained within the outer casing;

a window in the casing for allowing laser light generated by the laser to pass through; and a suspension device for ensuring that the laser light is emitted in a horizontal plane when the apparatus is held in a generally vertical operating condition, the method comprising steps of:

locating the apparatus onto a surface such that it is positioned in a generally vertical operating position with the laser light being emitted in a direction which is away from the surface on which the apparatus is located;

moving the apparatus in a generally vertical direction along the surface until the horizontal laser light coincides in height with the datum position; and marking the height of the laser onto the surface on which the apparatus is located.

13. The method of claim 12, wherein all of the steps are carried out by a single user.

14. A method for transferring the height of a main datum point to a remote, adjustable target using a hand-held levelling apparatus which comprises:

an outer casing;

a laser contained within the outer casing;

a window in the casing for allowing laser light generated by the laser to pass through; and a suspension device for ensuring that the laser light is emitted in a horizontal plane when the apparatus is held in a generally vertical operating condition, the method comprising steps of:

locating the apparatus onto the surface on which the main datum point is marked such that it is positioned in a generally vertical operating condition;

moving the apparatus in a generally vertical direction along the surface until the horizontal laser light, which is emitted in a direction which is away from the surface on which the apparatus is located, coincides in height with the remote, adjustable target;

measuring the difference in height between the laser light and the main datum point;

adjusting the remote, adjustable target by the measured difference in height such that the height of the target becomes the same as the height of the main datum point.

15. The method of claim 14, wherein all of the steps are carried out by a single user.

* * * * *